US009262346B2

(12) United States Patent
Muppirala et al.

(10) Patent No.: US 9,262,346 B2
(45) Date of Patent: Feb. 16, 2016

(54) PRIORITIZING INPUT/OUTPUTS AT A HOST BUS ADAPTER

(75) Inventors: Kishore Kumar Muppirala, Bangalore (IN); Satish Kumar Mopur, Bangalore (IN); Dinkar Sitaram, Bangalore (IN); Sumanesh Samanta, Bangalore (IN); Ayman Abouelwafa, Folsom, CA (US)

(73) Assignee: Hewlett Packard Enterprises Development LP, Houston, TX (US)

( * ) Notice: Subject to any disclaimer, the term of this patent is extended or adjusted under 35 U.S.C. 154(b) by 1339 days.

(21) Appl. No.: 12/819,312

(22) Filed: Jun. 21, 2010

(65) Prior Publication Data

US 2011/0314182 A1  Dec. 22, 2011

(51) Int. Cl.
*G06F 3/00* (2006.01)
*G06F 13/00* (2006.01)
*G06F 13/38* (2006.01)
*G06F 3/06* (2006.01)

(52) U.S. Cl.
CPC .............. *G06F 13/00* (2013.01); *G06F 3/061* (2013.01); *G06F 3/067* (2013.01); *G06F 3/0659* (2013.01); *G06F 13/385* (2013.01); *G06F 2213/0058* (2013.01); *G06F 2213/3808* (2013.01)

(58) Field of Classification Search
CPC ....... G06F 13/00; G06F 3/061; G06F 3/0659; G06F 3/067; G06F 13/385; G06F 2213/0058; G06F 2213/3808
See application file for complete search history.

(56) References Cited

U.S. PATENT DOCUMENTS

| 7,163,593 | B2 * | 1/2007 | Sugawara et al. | 148/321 |
|---|---|---|---|---|
| 7,213,113 | B2 * | 5/2007 | Sahin et al. | 711/162 |
| 7,602,774 | B1 * | 10/2009 | Sundaresan et al. | 370/381 |
| 7,668,177 | B1 * | 2/2010 | Trapp et al. | H01L 12/40032 |
| | | | | 370/395.42 |
| 7,673,074 | B1 * | 3/2010 | Sebastian et al. | 709/250 |
| 7,680,139 | B1 * | 3/2010 | Jones et al. | 370/414 |
| 2003/0119556 | A1 * | 6/2003 | Khan et al. | 455/560 |
| 2004/0032859 | A1 * | 2/2004 | Miao | 370/352 |
| 2004/0034683 | A1 * | 2/2004 | Zhao | 709/201 |
| 2004/0194095 | A1 * | 9/2004 | Lumb et al. | 718/100 |
| 2005/0080940 | A1 * | 4/2005 | Flynn, Jr. | 710/15 |
| 2006/0200588 | A1 * | 9/2006 | Won et al. | 710/5 |
| 2007/0027836 | A1 * | 2/2007 | Isobe et al. | 707/1 |
| 2007/0208849 | A1 * | 9/2007 | Ely et al. | 709/224 |
| 2008/0162735 | A1 * | 7/2008 | Voigt et al. | 710/6 |
| 2008/0168452 | A1 * | 7/2008 | Molaro et al. | 718/103 |
| 2008/0250042 | A1 * | 10/2008 | Mopur et al. | 707/100 |
| 2010/0118883 | A1 * | 5/2010 | Jones et al. | 370/412 |
| 2011/0231582 | A1 * | 9/2011 | Uysal et al. | 710/15 |

OTHER PUBLICATIONS

"Method to specify QOS(quality of service) for HBA(s) connected to a shared storage system in SAS based SAN's" by Hewlett-Packard Company, Vikas Sidana in Mar. 2008.*
Ajay Gulati, Efficient and Adaptive Proportional Share I/O Scheduling.

(Continued)

*Primary Examiner* — Henry Tsai
*Assistant Examiner* — Jing-Yih Shyu
(74) *Attorney, Agent, or Firm* — Philip S. Lyren

(57) ABSTRACT

A method generates input/output (IO) commands by plural different applications that execute on a host. The method prioritizes the applications by inserting different classifiers into the IO commands at a host bus adapter (HBA) located in the host. A storage device receives the IO commands and processes the IO commands according to priorities based on the classifiers for the applications.

20 Claims, 6 Drawing Sheets

(56) References Cited

OTHER PUBLICATIONS

Ajay Gulati, Efficient and Adaptive Proportional Share I/O Scheduling, Nov. 20, 2007 (internal date only).

Content processor, from http://en.wikipedia.org/wiki/Content_processor, updated Apr. 6, 2010.

IDC Analyze the Future: Market Context, 2008.

incits: Technical committee T10 SCSI Storage Interfaces, from http://www.t10.org/, Sep. 1, 2009.

Technical Committee T11, from http://www.t11.org/index.html, Sep. 1, 2010.

\* cited by examiner

| S1 No | Source Port ID/WWN | Storage Device Port ID/WWN | LUN ID/LUNWWN | Classifier Insertion Offset | Classifier To User | Purpose |
|---|---|---|---|---|---|---|
| 1 | <*> (or '-1') | SD1-portID | <*> (or '-1') | FCP_PRIORITY offset in FCP frame | "tag2" (say 2) | Tag All IOs to Storage Device Port "SD1-PortID" for ANY LUN with "tag2" in FCP_PRIORITY field of the FCP_CMND IU |
| 2 | <*> (or '-1') | SD1-portID | LUN-ID Range (say '0-32') | FCP_PRIORITY offset in FCP frame | "tag3" (say 3) | Tag All IOs to Storage Device Port "SD1-PortID" targeting LUNs with ID in the range 0-32, with "tag3" in FCP_PRIORITY field of the FCP_CMND IU |
| 3 | gPortID | SD2-portID | LUN-ID Range (say '10-14') | SCSI GID offset in FCP Frame | "tag4" | Tag All IOs from Initiator N_port "gPortID" targeting LUNs 10-14 behind SD2-PortID with "tag4" embedded in the SCSI GID field of the FCP_CMND IU |
| 4 | <*> (or '-1') | <*> (or '-1') | <*> (or '-1') | FCP_PRIORITY offset in FCP frame | "tag5" | Tag All IO from the server that is hosting the HBA to ANY SAN device. |

PRIORITIZING INPUT/OUTPUTS AT A HOST BUS ADAPTER

BACKGROUND

Host computers send input/output (I/O) requests to storage arrays to perform reads, writes, and maintenance. The storage arrays typically process the requests in a fraction of a second. In some instances, numerous hosts direct large numbers of requests toward a single storage array. If the array is not able to immediately process the requests, then the requests are queued.

I/O requests received at a storage device are processed according to predefined priorities. Historically, Small Computer System Interface (SCSI) storage devices had limited information for use in prioritizing I/Os. Thus, all I/Os were processed with a same priority and quality of service (QoS).

BRIEF DESCRIPTION OF THE DRAWINGS

FIG. 6 is a mapping table in accordance with an example embodiment.

DETAILED DESCRIPTION

Figure 1:
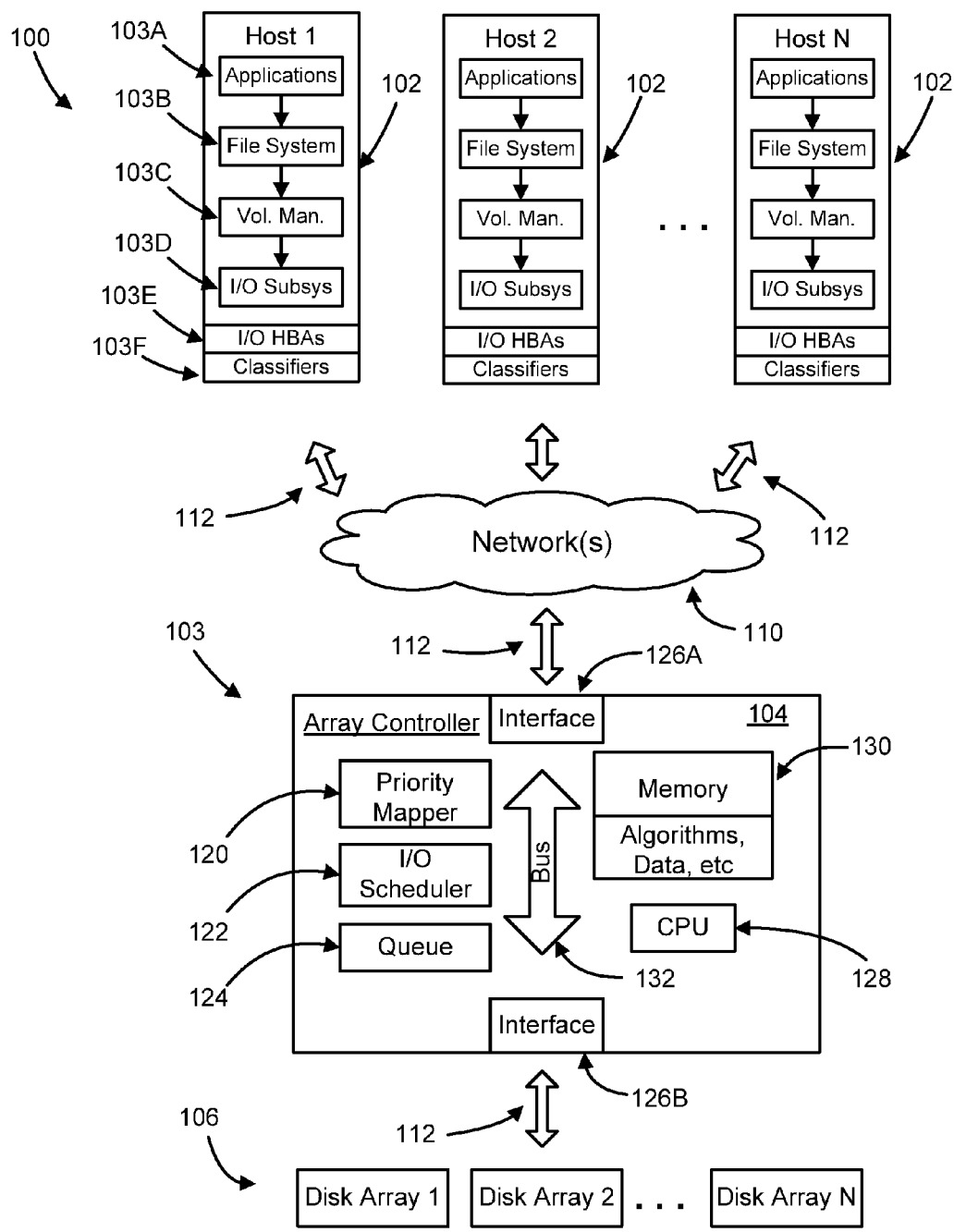
FIG. 1 is a block diagram of a storage system in accordance with an exemplary embodiment.

Embodiments in accordance with the present invention are directed to apparatus, systems, and methods for prioritizing input/outputs (IOs) at a host bus adapter (HBA) and then transmitting the IOs to storage devices. IOs of different applications executing on a single host or multiple hosts are classified or prioritized without requiring the applications to be modified.

One embodiment manages the classification of IO requests that leave a host (e.g., a server) destined to shared storage devices in a storage area network (SAN). A classifier embedded in the IO request is used to perform controlled scheduling to achieve Service Level Objectives (SLOs) associated with that classifier.

Example embodiments minimize changes to the operating system (OS) IO stack (e.g., by not requiring differentiation between two workloads/applications on the same OS instance to the Host Bus Adapter (HBA) for Fibre Channel or a Converged Network Adapter (CNA) for Fibre Channel over Ethernet interface driver). Example embodiments classify IO requests in the context of tagging IOs leaving a server destined for a designated storage device, or for a specific group of logical unit numbers (LUNs) in that designated storage device. Classification occurs at the HBA on the server. The servers include physical and/or virtual servers.

As used herein and in the claims, a "host bus adapter" or "HBA" is computer hardware that communicatively connects a computer (e.g., a host or server) to other network and/or storage devices. For example, HBAs connect a server to Small Computer System Interface (SCSI) and Fibre Channel storage devices.

With example embodiments, application level tagging enables a storage device to differentiate between IOs from different applications by tagging of the IO request frames. A single host can have multiple applications with each application having a different QoS or SLA priority for the IOs. A classifier is provided by each host as part of the IO request payload reaching the storage devices so that the storage device can classify and schedule different IO requests with an intent to meet the service levels desired for each workload. For example, if a host is connected to only one storage device, the host can tag all its IO requests with a single classifier value (e.g., "tag 1"). If a host is connected to two storage devices, the host can send two different classifier values (e.g., "tag 2" and "tag 1") to the different storage devices.

Thus, a single host can send different classifier values to different storage devices. These use-cases are referred to as "server level" classification. Other use-cases exists as well, such as LUN-level classification and support for virtualization. LUN-level classification stands for classifying IO requests from a host to a designated set of LUNs on a storage device (or across storage devices) with a given classifier. In the context of virtualization support, the classifier can be inserted in the IO requests on a per-guest instance basis. In this instance, the classifier is an extension of server level classification to guest level classification in virtualized environments. Example embodiments minimize changes in the OS layers and support the server level and LUN-level IO request classification while ensuring extensibility of the solution to virtualized environments.

SANs in accordance with example embodiments (which include Fibre Channel SANs, iSCSI SANs, FCoE SANs, etc.) enable storage consolidation and sharing among multiple servers and multiple applications being hosted on the servers. For example, virtualization techniques in data centers enable a single storage device to be shared by multiple Virtual Machines (VMs) and workloads or applications hosted within them. These applications can have different Quality of Service (QoS) or Service Level Agreements (SLAs) requirements for multiple, often competing, applications that share a single storage device.

Example embodiments enable an IO request to include classification information that transmits from a point of entry of the IO request into a kernel of the storage device.

In one exemplary embodiment, host computers run different operating systems with multiple different applications simultaneously executing on each host computer. Thus, hosts make I/O requests (example, read and write requests) to storage devices with varying expectations for command completion times. Embodiments in accordance with the present invention provide a system for managing priorities of I/O requests from multiple different servers and applications.

As used herein "SCSI" standards for small computer system interface that defines a standard interface and command set for transferring data between devices coupled to internal and external computer buses. SCSI connects a wide range of devices including, but not limited to, tape storage devices, printers, scanners, hard disks, drives, and other computer hardware and can be used on servers, workstations, and other computing devices.

In SCSI command protocol, an initiator (example, a host-side endpoint of a SCSI communication) sends a command to a target (example, a storage-device-side endpoint of the SCSI communication). Generally, the initiator requests data transfers from the targets, such as disk-drives, tape-drives, optical media devices, etc.

In a SCSI system, each device on a SCSI bus is assigned a logical unit number (LUN). A LUN is an address for an individual device, such as a peripheral device (example, a data storage device, disk drive, etc.). For instance, each disk drive in a disk array is provided with a unique LUN. The LUN is often used in conjunction with other addresses, such as the controller identification of the host bus adapter (HBA) and the target identification of the storage device.

SCSI devices include the HBA (i.e., device for connecting a computer to a SCSI bus) and the peripheral. The HBA provides a physical and logical connection between the SCSI bus and internal bus of the computer. SCSI devices are also provided with a unique device identification (ID). For instance, devices are interrogated for their World Wide Name (WWN). A SCSI ID (example, number in range of 0-15) is set for both the initiators and targets.

FIG. 1 is a block diagram of an exemplary distributed file or storage system 100 in accordance with an exemplary embodiment of the invention. By way of example, the system is a storage area network (SAN) that includes a plurality of host computers 102 (shown by way of example as host 1 to host N) and one or more storage devices 103 (one device being shown for illustration, but embodiments include multiple storage devices). The storage device 103 includes one or more storage controllers 104 (shown by way of example as an array controller), and a plurality of storage devices 106 (shown by way of example as disk array 1 to disk array N).

The host computers are coupled to the array controller 104 through one or more networks 110. For instance, the hosts communicate with the array controller using a small computer system interface (SCSI) bus/interface or other interface, bus, commands, etc. Further, by way of example, network 110 includes one or more of the internet, local area network (LAN), wide area network (WAN), etc. Communications links 112 are shown in the figure to represent communication paths or couplings between the hosts, controller, and storage devices. By way of example, such links include one or more SCSI buses and/or interfaces.

In one exemplary embodiment, each host 102 includes one or more of multiple applications 103A, file systems 103B, volume managers 103C, I/O subsystems 103D, and I/O HBAs 103E. As explained more fully below, the HBAs 103E include or store classifiers or mapping tables 103F.

If a host is a server, then each server can simultaneously run one or more different operating systems (OS) and applications (such as daemons in UNIX systems or services in Windows systems). Further, the hosts 102 can be on any combination of separate physical hardware and/or virtual computers sharing one or more HBAs. As such, storage can be virtualized at the volume manager level.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106. In one exemplary embodiment, storage controller 104 is a separate device or may be part of a computer system, such as a server. Additionally, the storage controller 104 may be located with, proximate, or a great geographical distance from the disk arrays 106.

The array controller 104 includes numerous electronic devices, circuit boards, electronic components, etc. By way of example, the array controller 104 includes a priority mapper 120, an I/O scheduler 122, a queue 124, one or more interfaces 126, one or more processors 128 (shown by way of example as a CPU, central processing unit), and memory 130. CPU 128 performs operations and tasks necessary to manage the various data storage and data retrieval requests received from host computers 102. For instance, processor 128 is coupled to a host interface 126A that provides a bidirectional data communication interface to one or more host computers 102. Processor 128 is also coupled to an array interface 126B that provides a bidirectional data communication interface to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including code to implement or assist in implementing embodiments in accordance with the present invention), and other data associated with the storage device. The processor 128 communicates with priority mapper 120, I/O scheduler 122, memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example applications 103A) so each initiator receives optimal performance, etc. Generally, the scheduler distributes storage device resources among plural initiators that are simultaneously requesting the resources. As such, resource starvation is minimized while fairness between requesting initiators is maximized.

Figure 2:
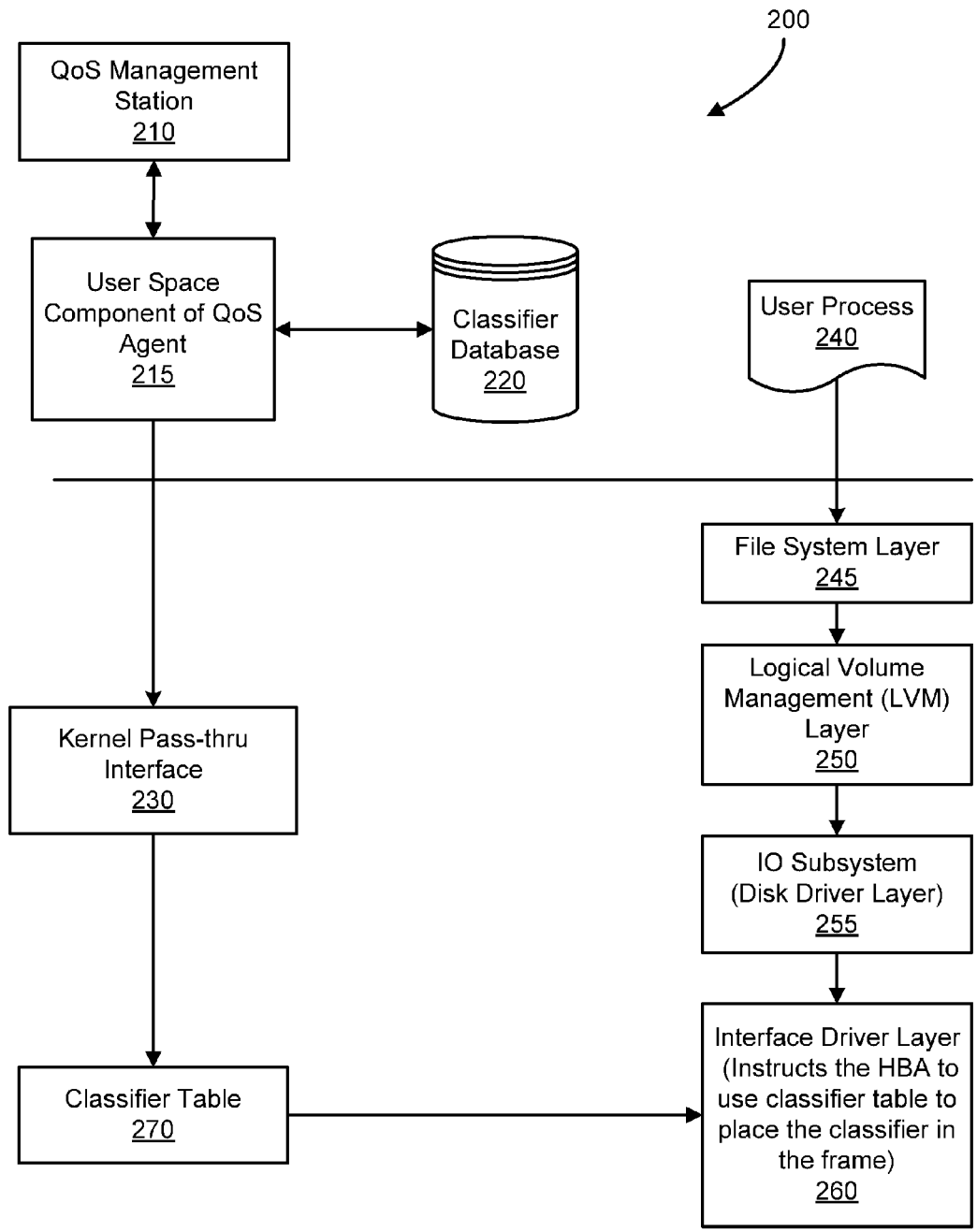
FIG. 2 shows a system to facilitate tagging of IO requests in accordance with an exemplary embodiment.

FIG. 2 shows a system 200 to facilitate tagging of IO requests in accordance with an exemplary embodiment. The system 200 includes a QoS management station 210 in communication with user space component of a QoS agent 215, classifier database 220, and kernel pass-thru interface 230. A user process 240 is in communication with a file system layer 245 which communicates with a logical volume management (LVM) layer 250, IO subsystem 255 (such as a disk drive layer), and an interface driver layer 260.

In operation, the kernel pass-thru interface 230 helps in passing-on the classifier table 270 to the interface driver layer 260 or HBA firmware. Usually the interface driver layer 260 passes-on or pushes the classifier table 270 to the HBA firmware or hardware. The HBA firmware places the classifier in the IO frame using the information provided in the classifier table 270 using a table look-up technique or Content Aware Processor (CAP) using associative table look-up.

The architecture in FIG. 2 illustrates how an HBA interface driver module can be programmed by a user-space agent (e.g., shown at 215) to accomplish tagging. In one embodiment, such tagging occurs based on an administrative utility, such as the QoS management station 210. The classifier value to use for different applications is externally specified, while the user space agent and classifier database 220 facilitate the external interaction with the QoS management station 210. The QoS management station is responsible for coordinating the classifier values that are used with different applications executing across various hosts, such as hosts in a data center that share QoS SAN attached storage devices employing multi-queue classification and differentiated scheduling.

Figure 3:
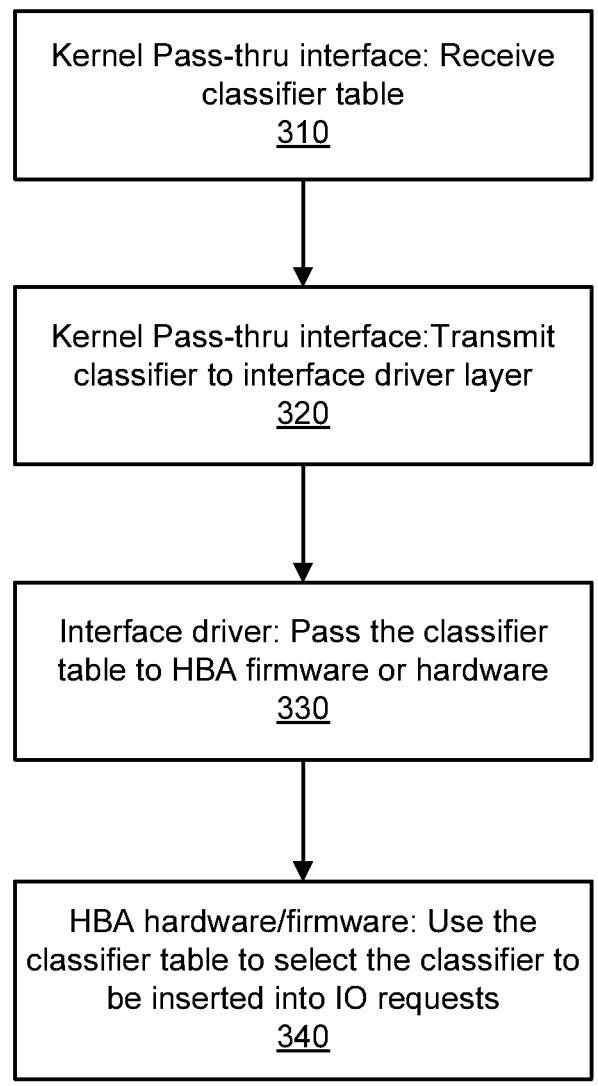
FIG. 3 is a flow diagram for generating priorities for I/O commands in accordance with an exemplary embodiment.

FIG. 3 shows a flow diagram for how the classifier is embedded in the IO command. FIG. 3 is discussed in conjunction with FIG. 2.

According to block 310, the kernel pass-thru interface 230 receives the classifier or classification table. For example, the classification table 270 is externally specified (e.g., by the QoS management station 210).

According to block 320, the kernel pass-thru interface 230 transmits the classifier or classification table 270 to the interface driver layer 260.

According to block 330, the interface driver layer 260 places the classification table into the HBA or HBA firmware. Upon receiving a classification table, at block 340, the HBA or HBA firmware will use the table to insert the desired classifiers into the IO request frames that carry the IO commands from the Hosts 102 to Storage devices 103.

Figure 4:
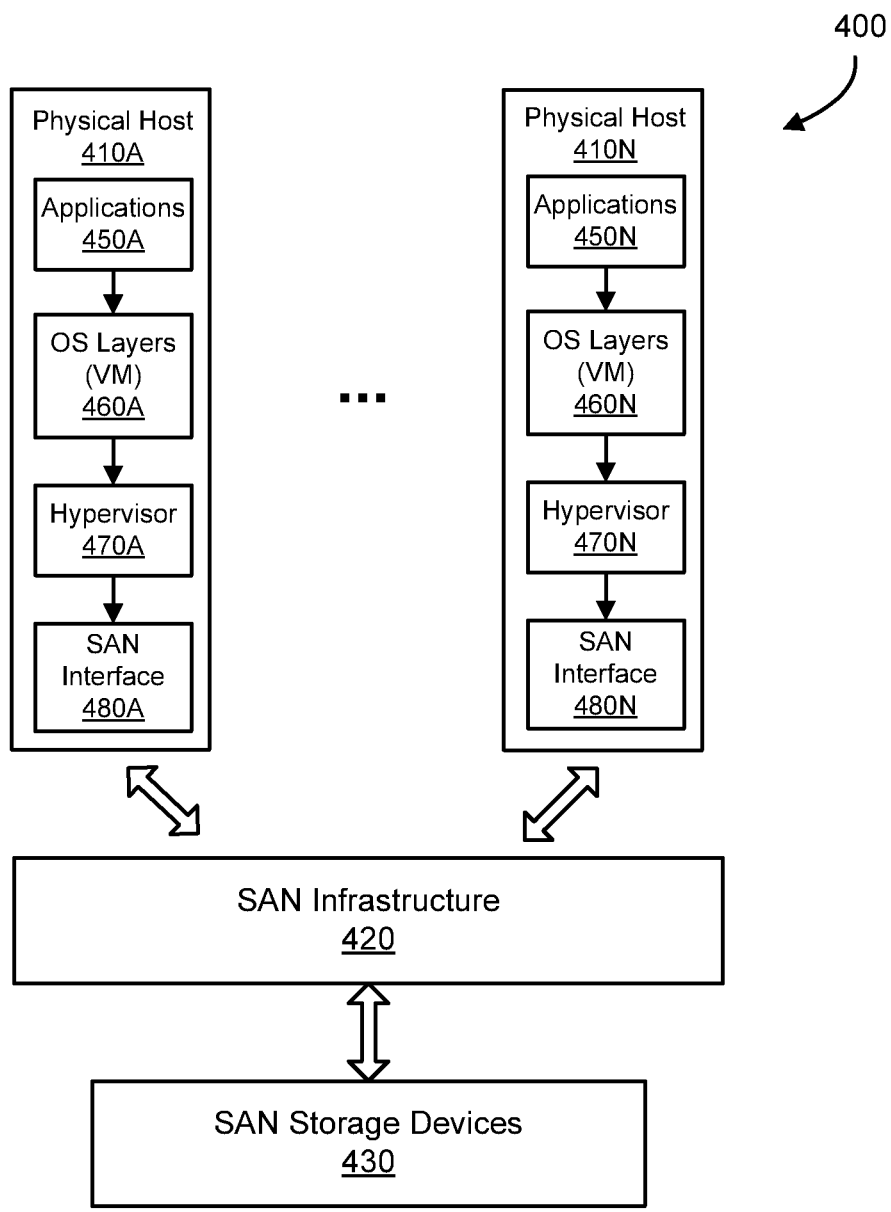
FIG. 4 shows a block diagram of storage system showing application interaction for end-to-end storage QoS when deployed in a virtual machine (VM) context in accordance with an exemplary embodiment.

FIG. 4 shows a block diagram of a storage system 400 showing application interaction for end-to-end storage QoS when deployed in a virtual machine (VM) context in accordance with an exemplary embodiment.

The storage system 400 includes a plurality of physical hosts 410A to 410N in communication with a SAN infrastructure 420 and SAN storage devices 430. Each of the physical hosts includes applications (shown as 450A and 450N), operating system layers (shown as 460A and 460N), hypervisor (shown as 470A and 470N), and SAN interface (shown as 480A and 480N).

As used herein and in the claims, a "hypervisor" is a virtual machine monitor (VMM) that allows multiple operating systems to run concurrently on a single host computer. The hypervisor presents the guest operating systems with a virtual platform and monitors the execution of these guest operating systems.

Figure 5:
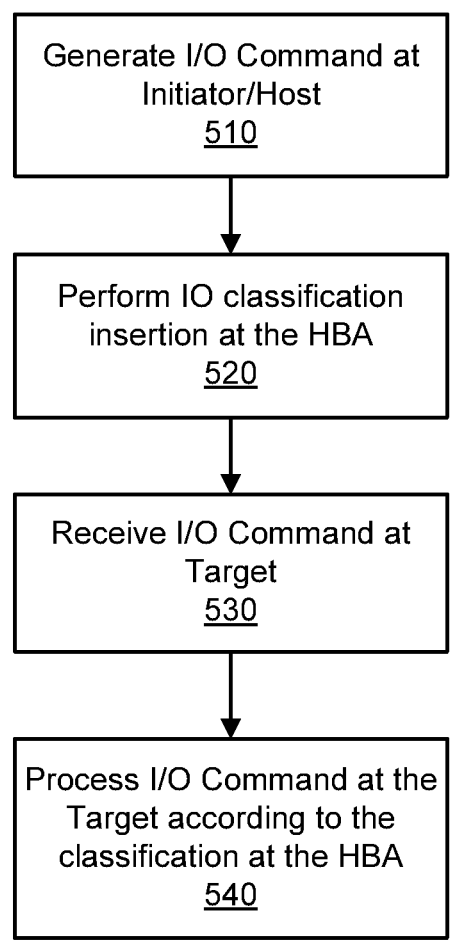
FIG. 5 is a flow diagram of a method for classifying IOs at the HBA in accordance with an example embodiment.

FIG. 5 is a flow diagram of a method for classifying IOs at the HBA in accordance with an example embodiment.

According to block 510, an IO command is generated at an initiator and/or host. For example, the IO originates from an application executing on the host. Since multiple applications can simultaneously execute on the host, a second application (different than the first application) can also generate an IO command destined for the same storage device.

According to block 520, the host bus adapter (HBA) of the initiator performs IO classification insertion for the IO. In other words, tagging occurs on the HBA side at the HBA driver (i.e., a tag is inserted into the IO request). For example, the HBA matches the IO request with entries in a classification table (i.e., put the table form a user state to a driver state). In this manner, the applications executing on the host and generating IOs are embedded with classifiers that prioritize the IO command for the application.

According to block 530, the IO is received at the target. For example, the IO is received at the storage device. The IOs from multiple applications executing on the host can be sent to the same or different storage devices.

According to block 540, the storage device processes the IO command according to the classification or tagging provided by the HBA. Thus, classification occurs at the HBA, and prioritization is executed at the storage device. In this manner, different applications executing on the host can generate IOs that are processed with different priorities.

In order to accomplish tagging for the server level and LUN level classification, one embodiment uses a mapping table that is implemented or embedded in the HBA interface driver or HBA firmware or even in HBA hardware to perform the desired classification. In another embodiment, the table is stored in the server memory as well which is addressed by the HBA.

FIG. 6 is a mapping table 600 in accordance with an example embodiment. Columns 1 (labeled "S1 No") and column 7 (labeled "Purpose") are provided for explanation and not required in the implemented hardware.

By way of example, a mapping table can have columns designated as: source port ID/WWN, storage device port ID/WWN, LUN ID (LUN WWN), classifier insertion offset, and classifier to use. The columns in the mapping table 600 are part of the Fibre Channel IO request frame as shown below:

(1) Source Port ID (or WWN): The Fibre Channel initiator port (N_port or VN_port) ID or the World Wide Name (WWN) of the same.

(2) Storage Device Port ID (or WWN): The Fibre Channel target port (N_port or VN_port) ID or WWN of the storage Device Port to which the IO request is heading to.

(3) LUN-ID or LUN WWN: The LUN Identifier of the LUN behind the storage device port to which the IO request is targeted to.

(4) Classifier Insertion Offset: This field represents the offset in the frame where the classifier should be inserted. The field can be programmed to specify the offset in the Fibre Channel Protocol (FCP) frame to manipulate and insert the classifier to be inserted. Classification can be realized by encapsulating the classifier either in the FCP_PRIORITY field or the SCSI GROUP ID field of the IO request payload. To encapsulate the classifier in the FCP_PRIORITY field of the FCP_C-MND IU, the offset value is the 10th byte in the FR frame. For encapsulating the classifier in the SCSI GROUP ID field of the FCP_CMND IU, the offset value is the first nibble of the 7th byte within the SCSI request command data block.

(5) Classifier to use: This field specifies the bits/numerical value of the classifier to be inserted into the IO request frame at the offset(s) specified by the Classifier Insertion Offset specification.

Row 3 of the table below shows how a guest-level tagging can be accomplished by specifying the VN_Port to which a guest IO is mapped to. Row 4 shows a whole host IO tagging enablement wherein the IO from the host carry the specified classifier value irrespective of the device to which it is destined.

In one example embodiment, the contents of the mapping table 600 are realized in chip firmware. In another example embodiment, the contents of the mapping table are realized in HBA hardware using CAP.

In a hypervisor implementation (shown in FIG. 4), each guest IO request can be routed using a different NPIV (or V_Port) associated with the physical HBA. Using the mapping table 600, the HBA firmware inserts the appropriate tag by searching the mapping table for the NPIV port_ID (or V_port ID) associated with the guest and the target device port ID/LUN ID and picking-up the classification information from the table.

As used herein and in the claims, the term "storage device" is any electronic device capable of storing data including, but not limited to, one or more of a disk array, a disk drive, a tape drive, optical drive, a SCSI device, or a fiber channel device.

As used herein and in the claims, a "disk array" or "array" is a storage system that includes one or more of plural disk drives, a cache, and controller. Arrays include, but are not limited to, networked attached storage (NAS) arrays, modular SAN arrays, monolithic SAN arrays, utility SAN arrays, and storage virtualization.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. A method executed by a storage system, comprising:
generating input/output (IO) commands by plural applications executing on a host;
retrieving, from a table stored in a host bus adapter (HBA) located in the host, classifiers that assign different priorities to different applications of the plural applications executing on the host;
prioritizing the different applications at the HBA by inserting the classifiers into the IO commands at the HBA; and
processing the IO commands at a storage device according to the priorities assigned by the classifiers for the different applications at the HBA.

2. The method of claim 1 wherein retrieving and inserting the classifiers into the IO commands includes receiving a classifier at a kernel pass-thru interface, transmitting the classifier to an interface device layer by the kernel pass-thru interface, placing the classifier into the HBA, and inserting the classifier into an IO request frame carrying the IO command.

3. The method of claim 1, wherein the classifiers are based on different Service Level Objectives (SLOs) for each of the plural applications executing on the host.

4. The method of claim 1, wherein the classifiers designate a different quality of service (QoS) of execution.

5. The method of claim 1 further comprising, differentiating, at the storage device, between different IOs generated by each of the different applications.

6. The method of claim 1 wherein the table includes a source port ID, a storage port ID, a logic unit number (LUN) ID, and a classifier insertion offset for each of the classifiers.

7. The method of claim 1 further comprising, encapsulating the classifiers in one of a FCP Priority Field and a SCSI Group ID Field of the IO commands in the context of Fibre Channel Protocol.

8. A non-transitory computer readable medium having instructions for causing a computer to execute a method, comprising:
generating a first input/output (IO) command by a first application executing on a host;
retrieving a first classifier from a mapping table stored in a host bus adapter (HBA) located in the host;
prioritizing the first application at the HBA by inserting the first classifier into the first IO command at the HBA;
generating a second IO command by a second application executing on the host;
retrieving a second classifier from the mapping table stored in the HBA;

prioritizing the second application at the HBA by inserting the second classifier into the second IO command at the HBA;

processing the first I/O command at a storage device according to a first priority assigned by the first classifier at the HBA; and processing the second I/O command at the storage device according to a second priority assigned by the second classifier at the HBA.

9. The computer readable medium of claim 8 further comprising, differentiating at the storage device between different priorities for the first and second IO commands based on the first and second classifiers.

10. The computer readable medium of claim 8, wherein the first and second classifiers are embedded in a firmware driver in the HBA.

11. The computer readable medium of claim 8 wherein retrieving and inserting each of the first and second classifiers into the first and second IO commands includes receiving a classifier at a kernel pass-thru interface, transmitting the classifier to an interface device layer by the kernel pass-thru interface, placing the classifier into the HBA, and inserting the classifier into an IO request frame carrying the IO command.

12. The computer readable medium of claim 8, wherein the first and second classifiers are embedded in the first and second I/O commands to perform controlled execution scheduling at the storage device.

13. The computer readable medium of claim 8, wherein the first and second classifiers are embedded in the first and second I/O commands to perform different service level objectives (SLOs) for each of the first and second applications.

14. The computer readable medium of claim 8, wherein the first and second applications receive a different quality of service (QoS) of execution at the storage device, the different QoS of execution derived from the first and second classifiers.

15. The computer readable medium of claim 8 further comprising, differentiating, at the storage device, between IOs generated by the first application and IOs generated by the second application.

16. A storage system, comprising:

a host that includes a host bus adapter (HBA) and plural applications generating IO commands, wherein a mapping table of classifiers that assign different priorities to different applications of the plural applications is stored in the HBA, wherein the HBA retrieves the classifiers from the mapping table and inserts the classifiers into the IO commands; and a storage device that receives the IO commands from the host and processes the IO commands according to priorities assigned by the classifiers for the different applications by the HBA.

17. The storage system of claim 16, wherein classification of the different applications occurs at the HBA.

18. The storage system of claim 16, wherein the mapping table includes a source port ID, a storage port ID, a logic unit number (LUN) ID, and a classifier insertion offset for each of the classifiers.

19. The storage system of claim 16, wherein the classifiers designate a different quality of service (QoS) of execution for the IO commands being executed at the storage device.

20. The storage system of claim 16, wherein the classifiers provide different Service Level Objectives (SLOs) for each of the applications when IO commands are executed at the storage device.

* * * * *